July 25, 1933.  H. K. TAYLOR  1,919,916
INSECT TRAP
Filed Oct. 28, 1927  2 Sheets-Sheet 1
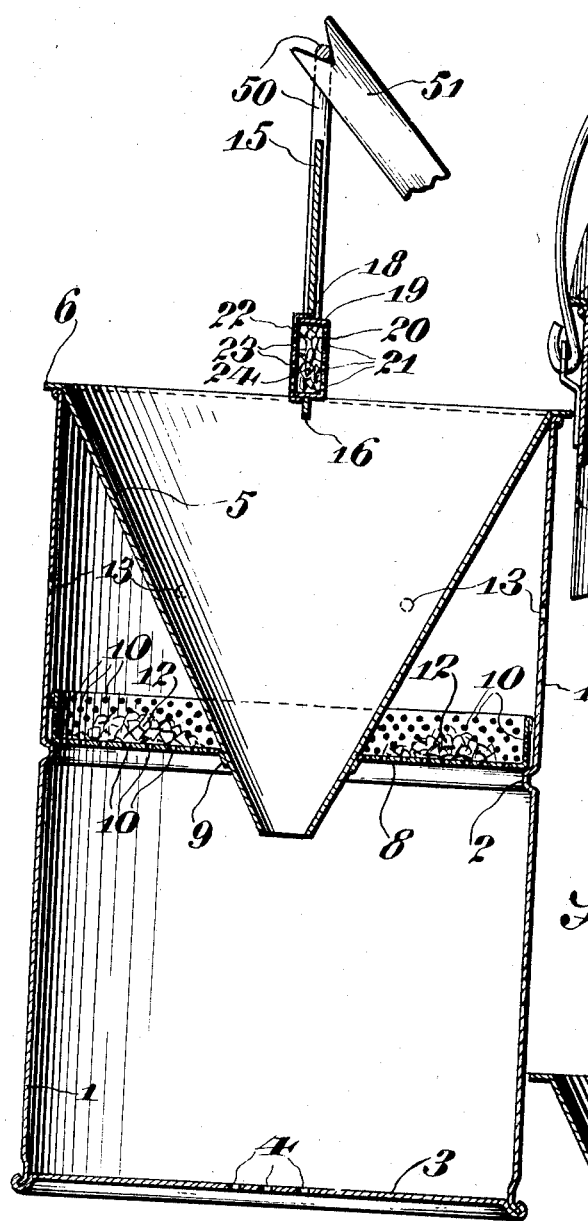
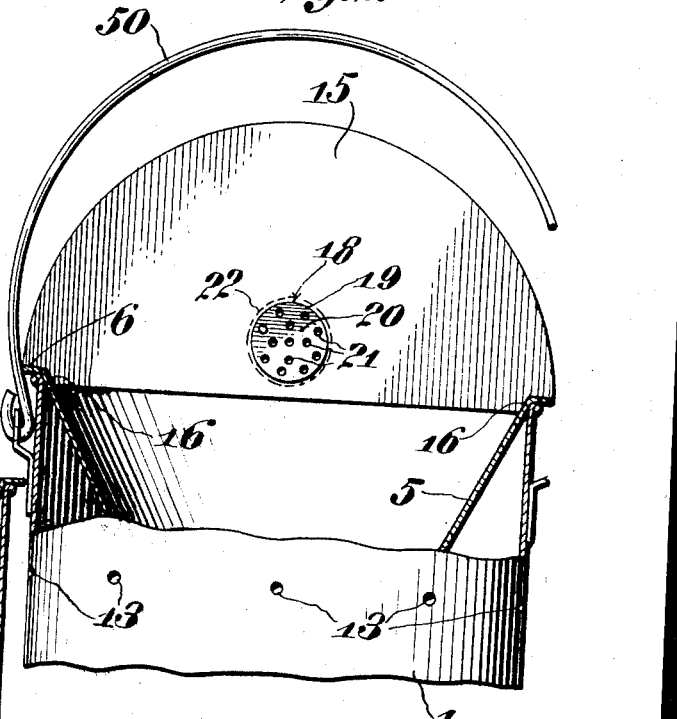
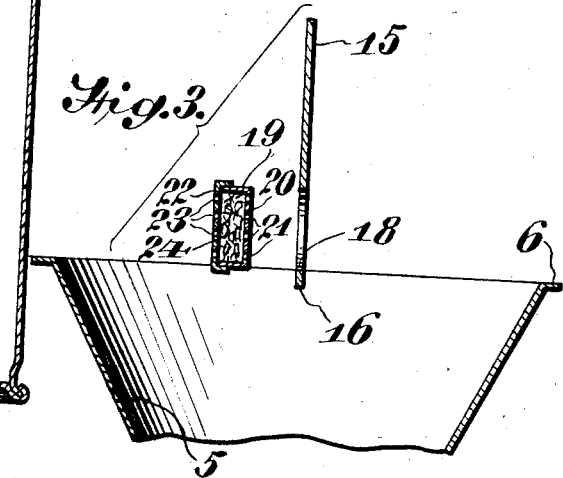
INVENTOR
Herbert K. Taylor
BY Cyrus N. Anderson
ATTORNEY July 25, 1933.  H. K. TAYLOR  1,919,916
INSECT TRAP
Filed Oct. 28, 1927   2 Sheets-Sheet 2
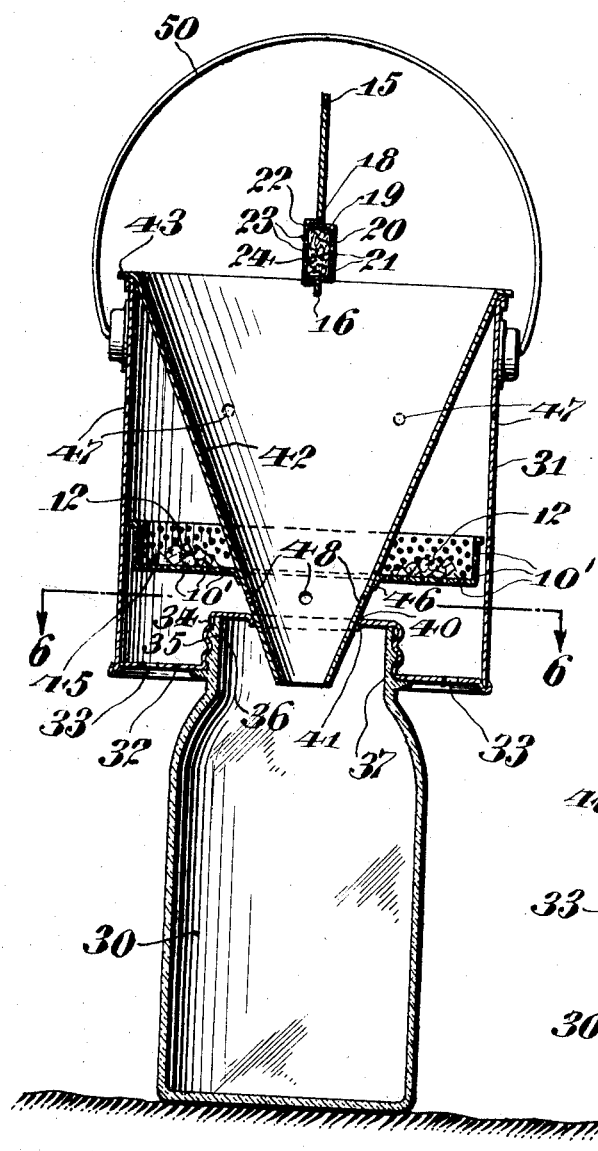
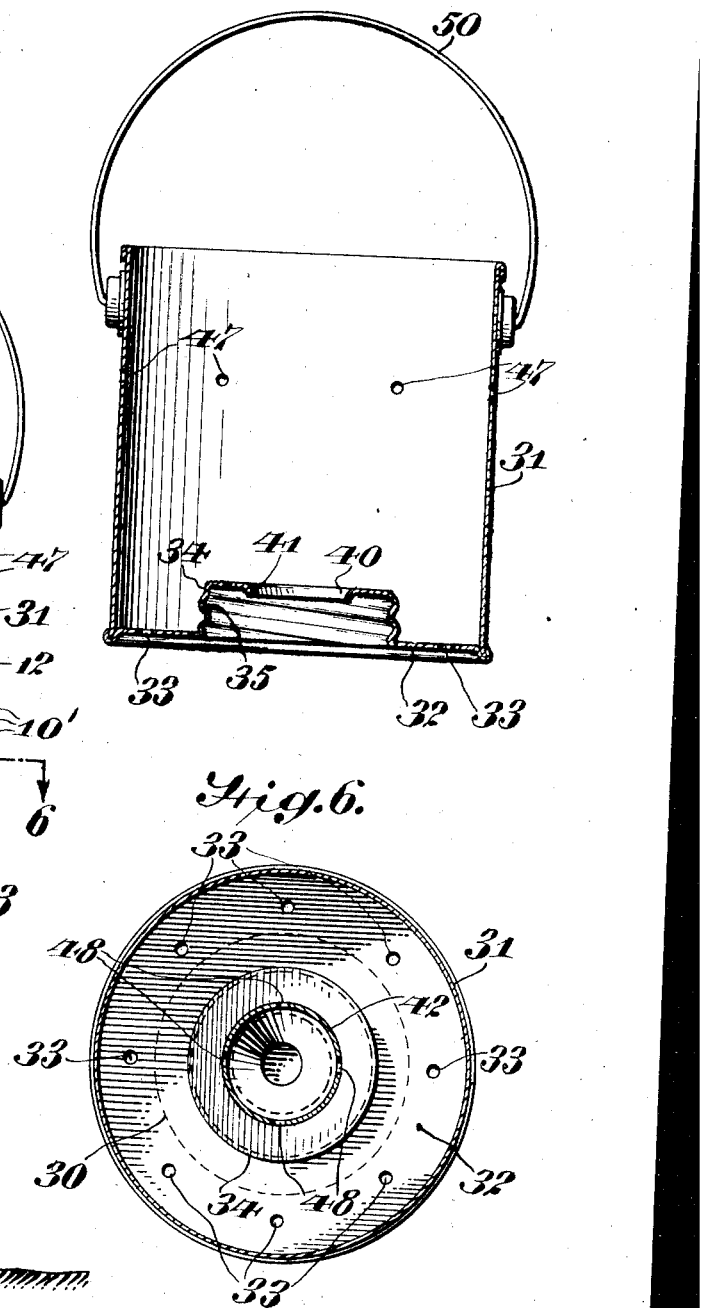
INVENTOR
Herbert K. Taylor
BY Cyrus N. Anderson
ATTORNEY Patented July 25, 1933

1,919,916

UNITED STATES PATENT OFFICE

HERBERT K. TAYLOR, OF ELKINS PARK, PENNSYLVANIA, ASSIGNOR TO GEORGE D. ELLIS AND SONS, INCORPORATED, OF PHILADELPHIA, PENNSYLVANIA, A CORPORATION OF PENNSYLVANIA

INSECT TRAP

Application filed October 28, 1927. Serial No. 229,291.

My invention relates to insect traps and has been designed particularly with a view to the entrapment of Japanese beetles.

The trap embodying my invention has been designed not only with a view to simplicity of construction, but also with a view to the provision of means for supporting and exposing an insect attractant and protecting the same from the rain and other weather conditions.

It also is an object of the invention to provide means for containing and supporting an attractant for the insects which it is desired to entrap, such as the Japanese beetle, in such manner as to render the trap more effective in the entrapment of insects which may be attracted by the attractant or bait.

Other objects and advantages of the invention will be pointed out in the detailed description thereof or will be apparent from such description. In order that the invention may be readily understood and its practical advantages fully appreciated reference may be had to the accompanying drawings in which I have illustrated certain convenient forms of embodiment thereof.

In the drawings:

Fig. 1 is a view in vertical longitudinal section of a trap embodying the invention and indicating the manner in which the same is supported in use;

Fig. 2 is a similar view of the upper portion of the trap taken in a plane substantially at right angles to that in which Fig. 1 is taken;

Fig. 3 is a view of a portion of the structure shown in Figs. 1 and 2, a container for a body or mass of insect attractant being shown in separated or detached relation with respect to its support.

Fig. 4 is a view in vertical longitudinal section of a trap showing a modification of the structure;

Fig. 5 is a view in central vertical longitudinal section of a portion of the superstructure of the trap; and Fig. 6 is a transverse sectional view taken on the line 6—6 of Fig. 4.

In Figures 1 to 3 of the drawings I have shown a container 1 which may consist of sheet metal or other suitable material which may be provided with an annular bead 2 upon its inner side formed by indenting the material in known manner.

The lower end of the container is closed by means of a bottom plate 3 having perforations 4 as shown. A funnel shaped member 5 is located in the upper portion of the container 1 and projects thereinto as shown. The said funnel shaped member 5 is provided with a lateral flange 6 at its upper end which overlies or rests upon the upper edge of the container 1. A pan shaped container 8 is provided at its center with an opening surrounded by a downwardly and inwardly extending flange 9 as shown in Fig. 1 of the drawings. The lower end portion of the funnel shaped member 5 projects through the said opening and is secured to the flange 9 by soldering or otherwise as illustrated. The bottom and side walls of the pan shaped container 8 are provided with perforations 10 as shown. The diameter of the pan like container 8 is slightly less than the internal diameter of the container 1. The relationship of the periphery of the container 8 to the internal diameter of the container 1 is clearly indicated in Fig. 1 of the drawings. The container 8 is adapted to hold material as indicated at 12 which in the present case is an attractant for Japanese beetles. The attractant employed may be such as that which is described in Letters Patent of the United States #1,572,568, dated February 9th, 1926.

The container 1 is provided with perforations located at intervals as indicated at 13. The funnel shaped member 5 is provided with an upwardly extending plate 15 the opposite ends of the lower edge of which are secured to points upon the upper edge of the said funnel shaped member 5 at diametrically opposed points as indicated at 16. The upper edge of the plate 15 may be curved as shown in Fig. 2 of the drawings or it may be of any other shape which may be preferred. The said plate preferably is provided near its lower edge and preferably at a central position thereof with an opening 18 within which a box 19 is adapted to be mounted one end of which is permanently closed by a bottom 20 having perforations 21 therein. The opposite end of the said box is adapted to be closed by a lid 22 of usual form or shape having perforations 23 therethrough. A portion of insect attractant 24 is placed within the box 19. The insect attractant 12 and 24 usually consists of the same material.

In the construction as illustrated in Figs. 4 to 6 inclusive of the drawings, I make use of a container 30 consisting of a jar of the Mason type. The entrapment section or portion of the structure is mounted upon the upper end of the container 30 and comprises an outer or external receptacle or member 31 of cylindrical shape in cross section which member may consist of sheet metal or other suitable material. The lower end of the member 31 is provided with a bottom comprising an annular portion 32 the outer edge or periphery of which is secured to the lower edge of the side walls of the said receptacle. The said annular portion 32 is provided with perforations at intervals as indicated at 33. The inner portion of the bottom is projected inwardly as indicated at 34 and the said inwardly projecting portion is screw threaded as shown at 35 for engagement with complemental screw threads 36 upon the exterior of the neck portion 37 of the container or jar 30. The portion 35, the inner end of which is partially closed as indicated, may be integral with the annular portion 32 and formed by means of a stamping operation or the said inwardly projecting portion may be otherwise provided. The top of the inwardly projecting portion 34 is provided with a central opening as indicated at 40 the edge of which is provided with a downwardly and inwardly extending flange 41. A funnel shaped member 42 is mounted within and upon the member 31 and its lower end portion projects through the opening 40 and contacts with the inner side of the flange 41. The upper edge of the funnel shaped member 42 is provided with a lateral flange 43 which extends over and rests upon the upper edge of the member 31. The lower end portion of the funnel shaped member 42 also extends through an opening formed in the central portion of the bottom of a pan like member 45, similar to the member 8 previously referred to, which opening is provided with a downwardly and inwardly extending flange 46 which is secured by soldering or otherwise to the outer side of the funnel shaped member 42 as shown in Fig. 4 of the drawings. The bottom and side of the pan shaped member 45 are provided with perforations 10' which are similar to the perforations 10 provided in the bottom and side of the member 8.

The member 31 is provided with perforations 47 at intervals as shown and the funnel shaped member 42 likewise is provided with perforations 48 located at intervals in that portion thereof below the pan shaped member 45. A mass or portion of insect attractant is placed within the annular portion of the pan shaped member 45 outside of the funnel shaped member 42.

The funnel shaped member 42 is also provided with parts 15, 19, 20, 21, 22, 23, and 24 which are identical with the parts correspondingly numbered in Figs. 1 to 3 of the drawings.

Both the container 1 and the member 31 are provided with a bail 50 by means of which the traps of the respective structures shown are adapted to be suspended from the upper projecting end of a stake or similar support 51 as indicated in Fig. 1 of the drawings. It will be understood that the lower end of this stake may be driven into the ground. In fact this stake would usually be driven into the ground because these traps are located out of doors in fields, gardens, lawns, pastures, etc.

In both forms of construction the plate 15 may be described as a baffle plate in that the insects; that is, the Japanese beetles, being attracted by the attractant collide with the plate 15, which may be of metal or other material having smooth surfaces upon its opposite sides and slide down into the funnel upon which the said plate may be supported. They escape from the lower end of the funnel into the lower end of the container in the construction as shown in Fig. 1 or into the jar 30 as shown in Fig. 4 of the drawings or into any other suitable container.

The perforations 4, 10 and 13 provided in the trap as illustrated in Fig. 1 of the drawings permit a circulation of air through the container 1 and through the insect attractant 12, whereby diffusion or dissipation of the odor of the latter is facilitated and increased.

In the construction as illustrated in Figs. 4 to 6 inclusive a similar circulation of the air takes place through the perforations 33, 10' and 47. The perforations 48 in the funnel shaped member 42 also aid in effecting diffusion of the odor of the said attractant.

Diffusion of the order from the attractant 24 is effected through the perforations in the bottom and top of the box 19 within which the said attractant is contained.

It has been found that traps of the character of those illustrated in the drawings and provided with an attractant as described, are very efficient in the entrapment of insects,—particularly Japanese beetles, for the entrapment of which the said trap has been especially designed and baited.

The beetles are attracted by the attractant or bait and in seeking the same pass through the funnel shaped members 5 or 42 into the bottom of the container 1 or into the container 30 as the case may be. Having entered these containers they are unable to escape therefrom by ascension through the small opening in the lower end of the funnel.

Having thus described my invention what I claim and desire to secure by Letters Patent is:

1. In an insect trap, the combination of a container adapted to receive insects which are entrapped, a funnel shaped member which projects into the said container, the said funnel being surrounded by an inclosing wall spaced therefrom, a pan like member having an opening through the central portion of its bottom through which the lower and smaller end portion of the said funnel extends, the edge of said opening being secured to the said funnel whereby the said pan like member is supported upon the said funnel, the said pan like member being provided with perforations, and means whereby air may circulate through the said perforations.

2. In an insect trap, the combination of a container adapted to receive insects which may be entrapped, a funnel supported upon the said container and having its lower end projecting thereinto and a single plate projecting across and above the said funnel and being located in a central plane extending longitudinally of the said container and funnel and the said plate being provided with means for containing and supporting an insect attractant.

3. In an insect trap, the combination of a receptacle for receiving insects which may be entrapped, a funnel projecting into the said container, the said funnel being surrounded by a wall spaced therefrom and supported at its upper and larger end on the top edge of said wall, means mounted upon the said funnel externally thereof for sustaining an insect attractant, the said means being located between the said funnel and the surrounding wall, and a plate located above the said funnel and the said container in a plane extending centrally and longitudinally of the said funnel and container.

4. In an insect trap, the combination of a receptacle for receiving insects which may be entrapped, a funnel projecting into the said container, the said funnel being surrounded by a wall spaced therefrom and supported at its upper and larger end on the top edge of said wall, means mounted upon the said funnel externally thereof for sustaining an insect attractant, the said means being located between the said funnel and the surrounding wall, a plate located above the said funnel, and the said last mentioned plate being provided with means for holding an attractant.

5. In an insect trap, the combination of a receptacle for receiving insects which may be entrapped, a funnel projecting into the said container, the said funnel being surrounded by a wall spaced therefrom and supported at its upper and larger end on the top edge of said wall, means mounted upon the said funnel externally thereof for sustaining an insect attractant, the said means being located between the said funnel and the surrounding wall, and means whereby air may flow through the space between the said funnel and the surrounding wall.

6. In a Japanese beetle trap, the combination of a receptacle for receiving the beetles which may be entrapped, a funnel having at its upper edge a laterally extending flange which is adapted to rest upon the upper edge of the said receptacle to support the funnel with its lower end projecting into the said container, and a perforated plate having a central opening through which the lower end portion of the said funnel extends, the edge of said opening being secured to the said funnel intermediate its ends and which plate is adapted to sustain an attractant for the beetles, and the said container having perforations in its bottom and in its side above the said perforated plate and outside of the said funnel whereby air is permitted to circulate through the said container and through the said attractant.

7. In a Japanese beetle trap, the combination of a container to receive beetles which may be entrapped, a funnel suspended from the upper end of said container and projecting thereinto, means located above said funnel in a plane extending longitudinally of said funnel with which means the beetles are adapted to collide and to be caused thereby to pass through said funnel into the said container, and a perforated container for a beetle attractant supported in adjoining relation to the bottom edge of said means.

8. In an insect trap, the combination of a container, a receptacle connected to said container, a funnel shaped member mounted upon said receptacle and projecting into said container, means located above the said funnel in a plane extending longitudinally of said funnel with which means the said insects are adapted to collide and to be caused thereby to enter and pass through the said funnel into the said container, and a perforated container for an insect attractant supported in adjoining relation to the bottom edge of said means.

9. In an insect trap, the combination of a container to receive insects which may be entrapped, a funnel shaped member supported at its upper larger end upon the upper edge of the said container, the said funnel projecting into the said container, a perforated plate of annular shape secured to the said funnel shaped member near its lower end and supported thereby, said plate being adapted to support a mass of insect attractant, and a plate supported in position above the said funnel, said plate being located in a plane extending centrally and longitudinally of the said container and funnel shaped member.

10. In an insect trap, the combination of a container to receive insects which may be entrapped, a funnel shaped member supported upon said container, the said funnel-shaped member projecting into the said container, a baffle plate located in a plane extending longitudinally of said funnel-shaped member, a perforated plate of annular shape secured to the said funnel-shaped member near its lower end and supported thereby, and means carried by said baffle plate for supporting and holding an insect attractant.

11. The combination of a container adapted to receive insects which may be entrapped, a funnel which is supported with its tapered small end projecting into the said container and a plate projecting across and above said funnel and being located in a plane extending longitudinally of the said receptacle and funnel against which plate insects are adapted to impinge and to be caused thereby to pass through the said funnel into the said receptacle, said plate being provided with an opening extending therethrough, and a perforated container mounted in said opening for holding an insect attractant.

12. In an insect trap, the combination of a container adapted to receive insects which may be entrapped, a funnel connected to the said container and having its lower end projecting thereinto, a single baffle plate extending across said funnel against which the insects collide and are caused thereby to pass through said funnel and into said container, and means connected to said baffle plate in adjoining relation to the bottom edge thereof for holding an insect attractant.

13. In an insect trap, the combination of a container adapted to receive insects which may be entrapped, a funnel connected to the said container and having its lower end projecting thereinto, a single baffle plate extending across said funnel against which the insects collide and are caused thereby to pass through said funnel and into said container, and a perforated container for an insect attractant located in adjoining relation to the bottom edge of the said baffle plate.

14. In an insect trap, the combination of a container adapted to receive insects which may be entrapped, a funnel connected to said container and having its lower end projecting thereinto, a single baffle plate extending across said funnel against which the insects collide and are caused thereby to pass through said funnel and into the said container, and a perforated container connected to said baffle plate in adjoining relation to the bottom edge thereof for containing and supporting an insect attractant.

15. In an insect trap, the combination of a container to receive insects which may be entrapped, a receptacle having a flanged opening formed in the bottom thereof whereby said receptacle is adapted to be connected to said container, a funnel shaped member supported upon said container, the lower end of said member extending through the said opening and into the said container, and a baffle plate extending across said funnel against which insects collide and are caused to pass through the said funnel and into the said receptacle.

16. In combination a cup-like bait receptacle having an annular, flanged, jar-engaging opening in its bottom, a funnel-like member arranged within said receptacle with its sloping side walls seated against the flange of said opening, a bait receptacle which extends crosswise of said funnel-like member, and a baffle plate having connection with said bait receptacle.

17. In a Japanese beetle trap, the combination of a funnel-shaped member, a single obstructing member extending across said funnel-shaped member against which beetles collide and are caused thereby to pass through said funnel, a container for a beetle attractant connected to said obstructing member near the bottom edge thereof, means for permitting air to circulate through the wall of the said funnel and through the said container, and a receptacle for receiving beetles which may be entrapped, the said funnel-shaped member having an annular member connected thereto for connecting the said funnel-shaped member to the said receptacle, the lower end of the said funnel-shaped member projecting into the said receptacle.

18. In combination a cup-like bait container having an annular, flanged, jar engaging opening in its bottom, a funnel-like member arranged within said container with its sloping side walls seated upon said flange, a bait receptacle extended across said member, and a baffle plate projected from said bait receptacle.

19. In combination a cup-like bait container having an annular, flanged, jar-engaging opening in its bottom, a funnel-like member arranged within said container with its sloping side walls juxtaposed to said flange, a bait receptacle extended across said member, and a baffle plate projected from said bait receptacle.

HERBERT K. TAYLOR.